US006370540B1

(12) United States Patent
Mc Namara et al.

(10) Patent No.: US 6,370,540 B1
(45) Date of Patent: Apr. 9, 2002

(54) CONTROLLER

(75) Inventors: Matthew Mc Namara, Salthill; Anthony O'Donovan Johnstone, Lower Salthill, both of (IE)

(73) Assignee: DMT Research and Development Limited, Galway (IE)

( * ) Notice: Subject to any disclaimer, the term of this patent is extended or adjusted under 35 U.S.C. 154(b) by 0 days.

(21) Appl. No.: 09/339,454

(22) Filed: Jun. 24, 1999

(30) Foreign Application Priority Data

Jun. 24, 1998 (IR) ................................................ 980508

(51) Int. Cl.$^7$ .............................................. G06F 17/30
(52) U.S. Cl. ......................................... 707/103; 707/10
(58) Field of Search .............................. 707/2, 3, 5, 10, 707/100, 102, 103, 104, 205; 700/17; 703/20; 705/26; 709/226, 100, 328; 600/300; 345/720, 716, 782, 848, 763; 717/2; 434/300

(56) References Cited

U.S. PATENT DOCUMENTS 6,006,230 A * 12/1999 Ludwig et al. ............... 707/10

* cited by examiner

*Primary Examiner*—Thomas Black
*Assistant Examiner*—Apu M Mofiz
(74) *Attorney, Agent, or Firm*—Keating & Bennett, LLP

(57) ABSTRACT

A controller for use in an object oriented environment connecting an information interface for a network user to a database. The controller optimises a memory usage in the environment by automatically generating a sub-object exist code used to ensure that all sub-objects of a released object are removed from memory. The controller also simulates a three tier client server model in which the class structure of the middle tier is retrieved from a database table allowing automatic amendments to the structure without the need for code modifications and testing reducing development time and costs.

7 Claims, 2 Drawing Sheets

CONTROLLER

The present invention relates to a controller and more particularly to a controller and control method for processing logical elements of a computer memory.

Reference is made throughout this specification to the use of objects and object oriented (OO) methodologies. It will however be appreciated, that the current invention is not software but a method for optimising use of system resources in an object oriented environment.

Object orientation, the technology based on objects and classes presently represents the best methodological framework for software engineering. Furthermore, its pragmatics provide the foundation for a systematic engineering discipline. By providing class support, for objects and classes of objects of an application, the object-oriented paradigm precepts more accurate modelling and implementation of systems. Use of these objects provide a canonical focus throughout the processes of analysis, design, and implementation by emphasizing the state, behaviour, and interaction of objects in its models.

Object-orientation works with both problem/solution and deliverables to provide a complete and comprehensive systemic approach to software development. The area of applicability for object oriented applications is very large and ranges from real-world application domain modelling and enterprise engineering to the use of polymorphism in programs and the architecture, modelling and implementation of the systems that run beneath them and the distributed systems that connect them. It is widely accepted that object orientation thus offers a better paradigm than that of structured techniques by providing significant improvement in basic component definition and interfacing. The applicability of object structures is perhaps most evident in improved interfaces, as interface objects provide connections to underlying objects. These underlying objects represent the conceptually complete components of a system and can be individually understood, combined, integrated and arranged in wide variety of configurations.

The principle advantages of object oriented methodologies are reuse, quality, stronger equivalence to the real world than other methodologies promoting "naturalness", encapsulation and higher cohesion/lower coupling. Object oriented systems are very resistant to change given that system objects change infrequently while processes and procedures in other paradigms are frequently changed, providing object-oriented systems with more resilient system organisation. Other advantages of object oriented code are faster development times, increased quality, easier maintenance and enhanced modifiability.

While object oriented applications are thus enormously useful in implementing systems they do suffer from a number of problems. For example when an object or sub object is required, it is loaded into computer read/write memory and used by the system as appropriate. When the object task is completed the system performs a check to determine whether any other object in the system refers to that object and releases it only if no pointers are found. This is wasteful of memory and thus adversely affects system performance in that frequently objects remain memory resident unnecessarily.

Another problem occurs in applications where the modelled system requires the use of a database, developments to the specification frequently require modifications to the database structure. Changes of this type necessitate using developers of considerable skill and thus greatly increases the cost and development time required for an application amendment.

A number of possible solutions to this particular problem have been proposed. One suggested method is to make use of an automated code generator to incorporate database modifications. The disadvantage in such an approach is that significant amendments to the source code are required. Once such amendments are necessary and have been made the code must be manually re-compiled and tested. This obviously increases modification costs and incurs what are often unacceptable delays. Furthermore, it raises maintainability issues, which in the light of year two thousand problems are becoming very important to the industry. In addition while these code generators work well with a small number of standard modifications their scope of reliable operation is limited. The only other alternative to these techniques is to manually recode the amendments by hand with obvious disadvantages. The ability to handle these amendments accurately and efficiently has a significant impact on data mapped to the database. Aspects of this problem are addressed in European Patent Application Number EP 0 690 375 IBM (International Business Machines Corporation). While the document discloses a method and system for mapping data in an object oriented environment (OOE) it does not address the particular problems described above. Another IBM application European Patent Application Number EP 0 684 569 shows a method for managing connections to a database for concurrent users in an OOE but again does not address the issues of resource optimisation to make ensure optimum use of memory and maintainability.

There is therefore a need for a controller which will address these requirements and overcome the aforementioned problems.

SUMMARY OF INVENTION

Accordingly there is provided a controller for use in an object oriented environment having means for connecting an information interface for a network user to a database for recording data entered by the network user and means for optimising memory usage in the object oriented environment performing the steps of:

receiving an object generation request from the information interface, automatically interrogating the received object generation requests to establish the existence of an associated sub-object and generating a sub-object exist code;

generating an object in a memory in response to the generation request and on receipt of a sub-object exist code automatically encoding the object with a container register and initialising an object stack;

processing data transfers between the information interface and the database until an object release request is received;

opening a driver object in response to the received object release request and generating a list of sub-objects for the driver object by referencing the container register;

indexing the list of sub-objects to the object stack and iteratively and sequentially reading the object stack to locate an object container register and generate an object container register detect signal;

iteratively detecting object container register detect signals and automatically opening each object in turn associated with an object container register, generating a list of sub-objects for the driver object of that object and indexing the list of sub-objects to the object stack and reading the object stack to locate further object container registers and generating an object container register detect signals; and generating a stack complete signal in response to the absence of further object container register detect signal indicating that all objects to be closed are listed in the object stack and processing the stack to delete all referenced objects.

It will thus be appreciated that by the relatively simple expedient of automatically assigning an encoded container register that all referenced objects to be closed are in fact closed. This both enhances system operations by ensuring maximum availability of resources and allows modelled systems to be run on smaller scale systems as memory usage is optimised. In prior art systems the inefficient use of memory meant that the computer used to model a given system had of necessity to be overspecified. This significantly increases costs and thus limits the accessibility of such systems to a wide range of potential users.

Preferably the controller further incorporates means for simulating a three tier client server object oriented environment of the having inter-tier communication, a front tier being connected to the information interface, a back tier being connected to the database and a middle tier providing a class structure of inter-operable objects communicating with the front tier and the back tier characterised in that the class structure is retrieved from a database table. This is an important feature of the current invention in that by retrieving the class structure in this manner problems of data field updates are overcome and additionally changes to the structure can be accommodated with absolute ease.

Ideally the means for simulating a three tier client server object oriented environment further incorporates means for performing the steps of:

creating an initial internal structure in the middle tier built from class definitions stored in a database table; and creating objects at run time based on the class structures, the class structure reflecting the hierarchical structure that exists between entities in the database.

This allows for abstraction in load and save routines, so that no specific coding for specific classes is required. This significantly reduces the time taken to implement database structure changes. Furthermore, the skill level required to accurately implement such changes is significantly reduced and thus costs are minimised.

Preferably objects are created in the middle tier using values for a class name, an instance id, and field names automatically retrieved through a defined interface from the table.

BRIEF DESCRIPTION OF THE DRAWINGS

The invention will be more clearly understood from the following description of an embodiment thereof, given by way of example only with reference to the accompanying drawings, in which.

DETAILED DESCRIPTION OF THE DRAWINGS

Figure 1:
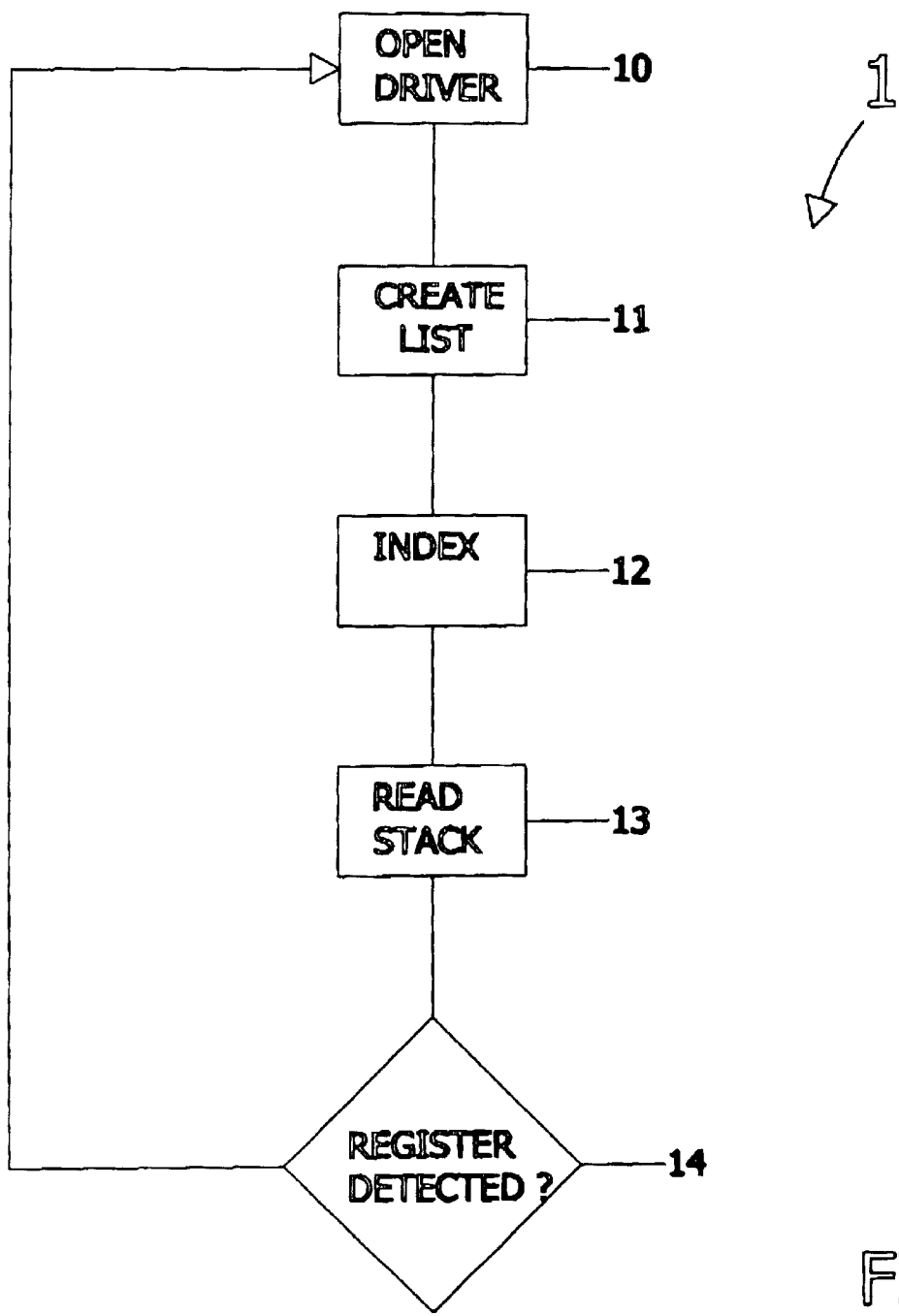
FIG. 1 is a flow diagram illustrating operation of a controller in accordance with the invention.
Figure 2:
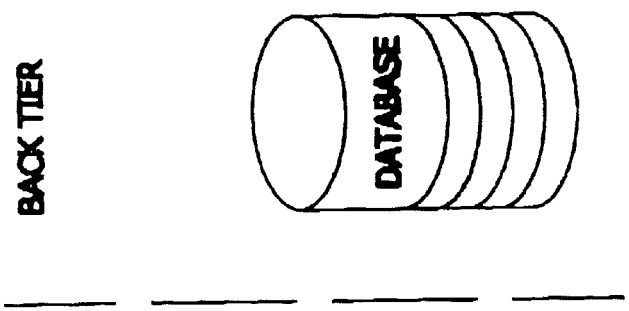
FIG. 2 is a diagrammatic view of a computer system incorporating a controller of the invention.
Figure 2:
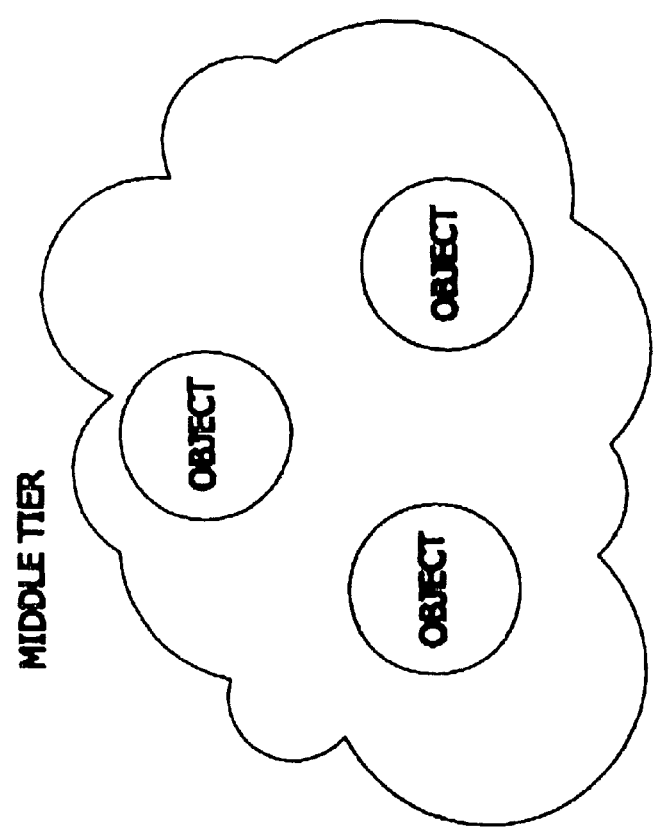
Figure 2:
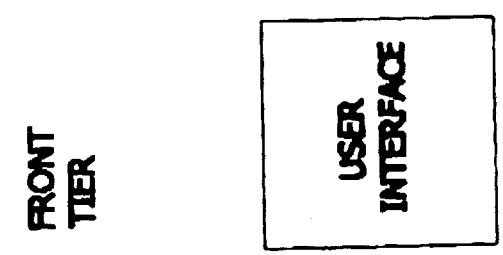

Referring to the drawings and initially to FIG. 1 there is illustrated a flow chart illustrating operation of a controller indicated generally by the reference numeral 1. In order not to unnecessarily obscure the present invention, specific performance details such as platforms, busses, processors, memory devices and communication channels have been omitted to aid clarity as they do not form part of the present invention.

In order to optimise use of system memory it is essential that all objects are released in a timely and appropriate manner. As mentioned above, the objects and all sub-objects cannot however be so released unless no pointers to those objects exist. In order to overcome this problem, as each object for which sub-objects exist is created in memory it is encoded with a container register and an object stack is initialised.

When an object is then released and should be deleted from system memory the following sequence is followed. A driver object is opened in step 10. A list of sub-objects for the driver object of step 10 is created in step 11.

The list of sub-objects is then indexed to the object stack in step 12. The object stack is the iteratively and sequentially read in step 13 and a check is performed in step 14 to determine whether the object container register is set. If a register is detected in step 14 this object is then opened at step 10 and the process repeated until all objects to be closed are listed in the object stack. The stack is then processed in the conventional manner of stack operations to delete all referenced objects.

It will thus be appreciated that by the relatively simple expedient of automatically assigning an encoded container register that all reference objects to be closed are in fact closed. This both enhances system operations by ensuring maximum availability of resources and allows modelled systems to be run on smaller scale systems.

For applications running databases and requiring data input from a user the data must be routed to tables within a database. Mainframe hosted applications typically achieve this by providing an interface for the user to type data, which is then written directly to a database table. Another approach may be to store the user's data in variables until they have been validated, and then write them in one go to the tables. This approach gives more control over database updates but is extremely difficult to maintain in anything but the most simple systems.

A still further approach is to achieve the data update is to create classes. These classes represent entities in the application and store the inputted data in instances of these classes. They are thus stored until they can be written to the database. This approach is the de facto standard for Client Server or three tiered applications, as it allows data and business logic to be concentrated on an intermediate server, before being written to the database. It will be apparent to those skilled in the art that the intermediate server may physically be located on the same computer as the user input interface. The drawback is with this Client Server approach is that if the database structure changes re-coding is involved in the classes and also in the code to save the entity.

In order to overcome these problems, the invention simulates the Client Server approach, but its class structure is retrieved from a database table. This is an important feature of the current invention in that by retrieving the class structure in this manner problems of data update are overcome and additionally changes to the structure can be accommodated with absolute ease.

When the middle tier of the three tier is first created, an initial internal structure is built from class definitions stored in a database table. Objects are then created at run time based on the class structures. The class structure built is hierarchical, and can therefore reflect the hierarchical structure that exists between entities in most databases. This approach allows for abstraction in load and save routines, so that it requires no specific coding for specific classes. It will be appreciated that this significantly reduces the time taken to implement database structure changes. Furthermore, the skill level required to accurately implement such changes is significantly reduced and thus costs are minimised.

Values in the middle tier are retrieved through a defined interface. The class names, instance id, and field names are used to identify individual fields. A Current object is also maintained for each class. Since field names must be unique, this means the dataStore can set or retrieve a field value given only a field name. All field values in a class can be retrieved in a single call and this is particularly useful when initializing forms. It can also return all of the changed values in one call. This is used to refresh a form after a business rule has run. These features are especially useful when the middle tier is accessed via DCom on a remote Server, to reduce network traffic.

It will be appreciated that the invention provides a self-designing hierarchical collection of objects.

Class information retrieved from the database, defines class relationships and hierarchies to generate collections. Container registers are assigned to objects being class instances which have sub-objects. The collections are processed to define a hierarchical tree structure, with various objects hanging off other objects.

Memory is organised to received data in array format and adds each row to memory as fields within a newly added object of the required type at the required spot in the tree. Accessing the data is achieved by requesting the desired field value by specifying the path to the field. Alternatively, if the object from which data is requested is the current object requesting the current field returns that field value from the current object.

When it is desired to add a new object to the tree, a command is issued and the object added. Fields are then added to this new object using the user interface.

The invention is not limited to the embodiment hereinbefore described but may be varied in both construction and detail within the scope of the appended claims.

What is claimed is:

1. A controller for use in an object oriented environment having means for connecting an information interface for a network user to a database for recording data entered by the network user and means for optimising a memory usage in the object oriented environment performing the steps of:

receiving an object generation request from the information interface, automatically interrogating the received object generation requests to establish the existence of an associated sub-object and generating a sub-object exist code;

generating an object in a memory in response to the generation request and on receipt of a sub-object exist code automatically encoding the object with a container register and initialising an object stack;

processing data transfers between the information interface and the database until an object release request is received;

opening a driver object in response to the received object release request and generating a list of sub-objects for the driver object by referencing the container register;

indexing the list of sub-objects to the object stack and iteratively and sequentially reading the object stack to locate an object container register and generate an object container register detect signal;

iteratively detecting object container register detect signals and automatically opening each object in turn associated with an object container register, generating a list of sub-objects for the driver object of that object and indexing the list of sub-objects to the object stack and reading the object stack to locate further object container registers and generating an object container register detect signals; and generating a stack complete signal in response to the absence of further object container register detect signal indicating that all objects to be closed are listed in the object stack and processing the stack to delete all referenced objects.

2. A controller as claimed in claim 1 wherein the controller further incorporates means for simulating a three tier client server object oriented environment of the having inter-tier communication, a front tier being connected to the information interface, a back tier being connected to the database and a middle tier providing a class structure of inter-operable objects communicating with the front tier and the back tier characterised in that the class structure is retrieved from a database table.

3. A controller as claimed in claim 2 wherein the means for simulating a three tier client server object oriented environment further incorporates means for performing the steps of:

creating an initial internal structure in the middle tier built from class definitions stored in a database table;

creating objects at run time based on the class structures, the class structure reflecting the hierarchical structure that exists between entities in the database.

4. A controller as claimed in claim 3 wherein objects are created in the middle tier using values for a class name, an instance id, and field names automatically retrieved through a defined interface from the table.

5. A controller as claimed in claim 4 wherein the memory is formed to received data in array format.

6. A controller as claimed in claim 5 wherein the memory is formed to received data in array format.

7. A controller as claimed in claim 6 wherein rows are added to the array format as fields within a newly added object are found from the table.

* * * * *